United States Patent
Onoue et al.

(10) Patent No.: US 10,967,948 B2
(45) Date of Patent: Apr. 6, 2021

(54) OUTBOARD MOTOR AND DAMPER FOR PROPELLER UNIT

(71) Applicant: YAMAHA HATSUDOKI KABUSHIKI KAISHA, Iwata (JP)

(72) Inventors: Junya Onoue, Shizuoka (JP); Toshio Suzuki, Shizuoka (JP); Kenji Yukishima, Shizuoka (JP); Noriyuki Natsume, Shizuoka (JP); Manabu Yamamoto, Shizuoka (JP); Koma Ariga, Shizuoka (JP); Shunsuke Yukawa, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 168 days.

(21) Appl. No.: 16/289,726

(22) Filed: Mar. 1, 2019

(65) Prior Publication Data
US 2019/0270501 A1 Sep. 5, 2019

(30) Foreign Application Priority Data
Mar. 2, 2018 (JP) .............................. JP2018-037692

(51) Int. Cl.
*B63H 1/15* (2006.01)
*B63H 23/32* (2006.01)
*B63H 20/14* (2006.01)
*B63H 23/34* (2006.01)
*F16D 3/12* (2006.01)

(52) U.S. Cl.
CPC ............ *B63H 23/321* (2013.01); *B63H 20/14* (2013.01); *B63H 23/34* (2013.01); *B63H 2023/322* (2013.01); *B63H 2023/342* (2013.01); *F16C 2326/30* (2013.01); *F16D 3/12* (2013.01)

(58) Field of Classification Search
CPC .. B63H 23/321; B63H 2023/342; B63H 1/20; F16D 3/12
See application file for complete search history.

(56) References Cited

U.S. PATENT DOCUMENTS

| | | | |
|---|---|---|---|
| 8,419,489 B2 * | 4/2013 | Tsunekawa | B63H 1/15 440/83 |
| 2006/0263219 A1 * | 11/2006 | Dean | B63H 1/20 416/134 R |
| 2008/0146097 A1 | 6/2008 | Iwashita | |
| 2014/0205455 A1 * | 7/2014 | Kuroki | B63H 20/14 416/134 R |
| 2015/0336647 A1 | 11/2015 | Ariga | |

FOREIGN PATENT DOCUMENTS

JP 4979363 B2 7/2012
JP 2015-217893 A 12/2015

* cited by examiner

*Primary Examiner* — Andrew Polay
(74) *Attorney, Agent, or Firm* — Keating and Bennett, LLP

(57) ABSTRACT

In an outboard motor, a damper includes a bushing fixed to a periphery of a propeller shaft. The damper includes a second pressing surface that presses a first pressing surface of an inner surface of a cylinder in a circumferential direction, an elastic member disposed around a portion of the bushing different from the second pressing surface of the bushing, and a reinforcer disposed between the first pressing surface and the second pressing surface.

20 Claims, 9 Drawing Sheets

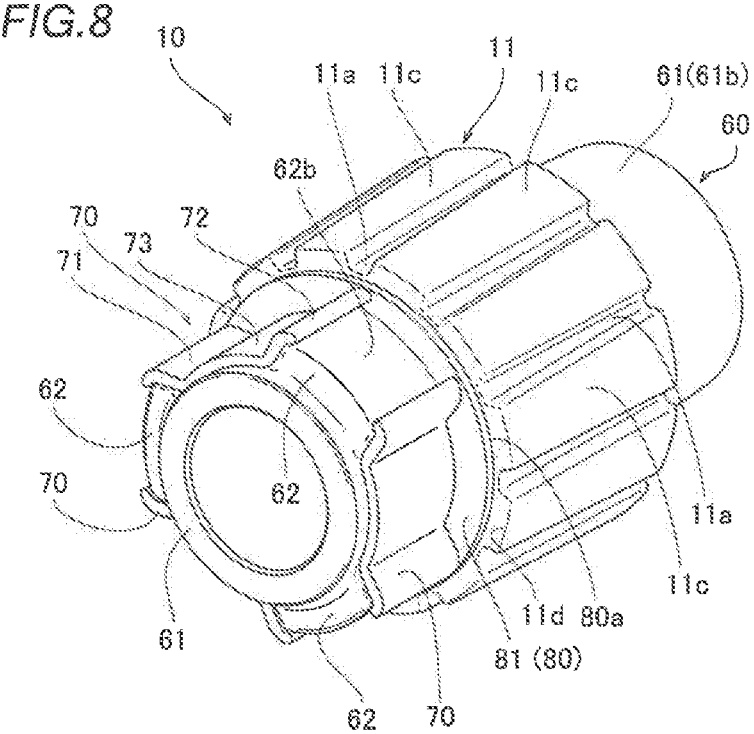
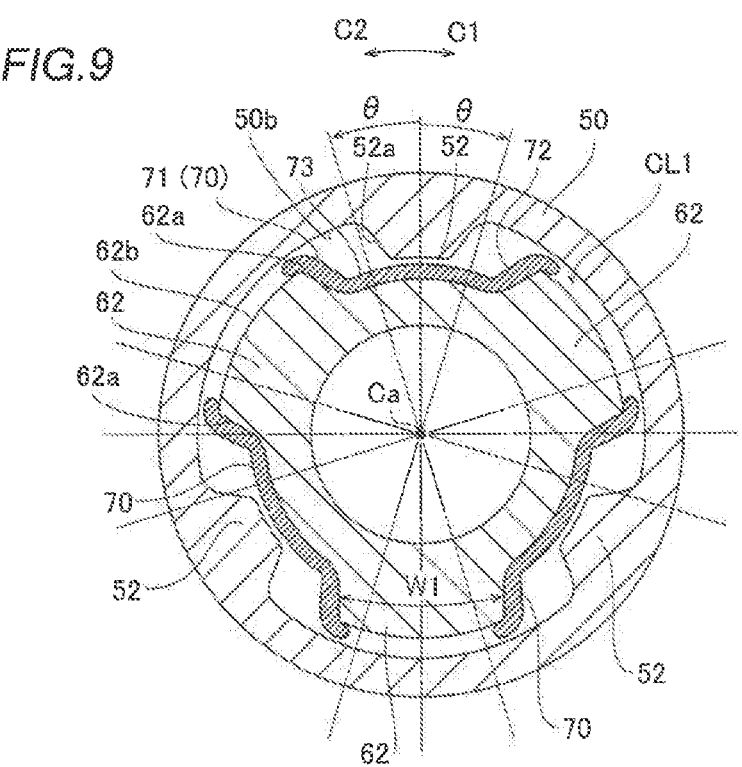

OUTBOARD MOTOR AND DAMPER FOR PROPELLER UNIT

CROSS REFERENCE TO RELATED APPLICATIONS

This application claims the benefit of priority to Japanese Patent Application No. 2018-037692 filed on Mar. 2, 2018. The entire contents of this application are hereby incorporated herein by reference.

BACKGROUND OF THE INVENTION

1. Field of the Invention

The present invention relates to an outboard motor and a damper for a propeller unit.

2. Description of the Related Art

A damper for a propeller unit including a bushing fixed around a propeller shaft is known in general. Such a damper is disclosed in Japanese Patent Laid-Open No. 2015-217893, for example.

Japanese Patent Laid-Open No. 2015-217893 discloses a propeller for a vessel propulsion device including a bushing that rotates integrally with a propeller shaft and a propeller damper made of an elastic material and disposed around the bushing. The bushing of the propeller includes a first protrusion that protrudes outward. The propeller also includes a propeller cylinder that surrounds the bushing via the propeller damper and includes a second protrusion that protrudes inward. The propeller cylinder rotates with respect to the bushing between a noncontact position at which the first protrusion and the second protrusion are separate from each other in a circumferential direction and a contact position at which the first protrusion and the second protrusion contact with each other due to elastic deformation of the propeller damper. The propeller damper transmits rotational motion from an engine via the propeller shaft to the propeller cylinder including blades in a state in which the first protrusion and the second protrusion contact with each other. Thus, in this propeller, a thrust force is generated by the blades.

In the propeller disclosed in Japanese Patent Laid-Open No. 2015-217893, the first protrusion of the bushing is moved between the noncontact position at which the first protrusion of the bushing and the second protrusion of the propeller cylinder are separate from each other in the circumferential direction and the contact position at which the first protrusion and the second protrusion contact with each other due to elastic deformation of the propeller damper. Therefore, when the first protrusion and the second protrusion contact with each other, a contact portion of the first protrusion and a contact portion of the second protrusion rub against each other. For example, in a state in which the first protrusion and the second protrusion contact with each other, the load generated on the blades is unbalanced such that vibrations (impacts) are transmitted from the blades to the first protrusion and the second protrusion, and the contact portion of the first protrusion and the contact portion of the second protrusion rub against each other. In general, a bushing and a propeller damper are replaceable. Therefore, when a first protrusion of the bushing wears and deforms due to rubbing against a second protrusion, it becomes necessary to replace the bushing (and the propeller damper). Particularly, in a propulsion device (outboard motor) having a relatively large propulsion force, vibrations from blades tend to become large, and in a propeller for a propulsion device (outboard motor) attached to a hull having a special shape, the load generated on blades tends to be unbalanced, and vibrations from the blades become large. Thus, conceivably, the amount of wear of a bushing increases, the life of the bushing decreases, and the frequency of replacement of the bushing (and a propeller damper) increases. Therefore, an outboard motor and a damper for a propeller unit in which an increase in the amount of wear of a bushing is significantly reduced or prevented such that an increase in the frequency of replacement of the bushing and a propeller damper (the damper of the propeller unit) is significantly reduced or prevented have been desired.

SUMMARY OF THE INVENTION

Preferred embodiments of the present invention provide outboard motors and dampers for propeller units in which an increase in the amount of wear of bushings is significantly reduced or prevented such that an increase in the frequency of replacement of the dampers is significantly reduced or prevented.

An outboard motor according to a preferred embodiment of the present invention includes a propeller shaft and a propeller unit disposed on the propeller shaft, the propeller unit including a damper disposed around the propeller shaft, a cylinder including a first pressing surface on an inner surface thereof, disposed around the damper, and that engages with the damper, and a blade disposed radially outward of the cylinder, wherein the damper includes a bushing fixed to a periphery of the propeller shaft and including a second pressing surface that presses the first pressing surface of the cylinder in a circumferential direction, an elastic member disposed around a portion of the bushing different from the second pressing surface of the bushing in an axial direction and that elastically and deformably engages with the inner surface of the cylinder, and a reinforcer provided separately from the bushing and disposed between the first pressing surface and the second pressing surface.

In an outboard motor according to a preferred embodiment of the present invention, the damper includes the reinforcer provided separately from the bushing and disposed between the first pressing surface and the second pressing surface. Accordingly, the first pressing surface and the second pressing surface press against each other via the reinforcer. Consequently, the second pressing surface and the reinforcer rub against each other without rubbing of the first pressing surface and the second pressing surface due to direct contact therebetween. Consequently, an increase in the amount of wear of the first pressing surface (bushing) is significantly reduced or prevented as compared with the case in which the first pressing surface and the second pressing surface directly contact with each other and rub against each other. Consequently, an increase in the frequency of replacement of the damper of the propeller unit is significantly reduced or prevented.

In an outboard motor according to a preferred embodiment of the present invention, the reinforcer is preferably movable relative to each of the first pressing surface and the second pressing surface. Accordingly, the first pressing surface and the reinforcer rub against each other, and the second pressing surface and the reinforcer rub against each other. Consequently, the amount of friction on the first pressing surface is reduced due to friction between the second pressing surface and the reinforcer (dispersion of friction) as compared with the amount of friction on the first pressing surface generated when the first pressing surface and the second pressing surface directly contact with each other and press against each other. Consequently, an increase in the amount of wear of the first pressing surface (bushing) is further significantly reduced or prevented, and thus an increase in the frequency of replacement of the damper of the propeller unit is further significantly reduced or prevented.

In an outboard motor according to a preferred embodiment of the present invention, a wear resistance of a material of which the reinforcer is made is preferably higher than a wear resistance of a material of which the bushing is made. Accordingly, the amount of wear of the reinforcer is reduced, and thus the life of the reinforcer is further increased.

In an outboard motor according to a preferred embodiment of the present invention, the cylinder preferably includes a first protrusion including the first pressing surface and that protrudes radially inward from the inner surface of the cylinder, the bushing preferably includes a second protrusion including the second pressing surface and that protrudes toward the inner surface of the cylinder, and the reinforcer is preferably disposed between the first pressing surface defining a side surface of the first protrusion in the circumferential direction and the second pressing surface defining a side surface of the second protrusion in the circumferential direction. Accordingly, the side surface of the first protrusion in the circumferential direction and the side surface of the second protrusion in the circumferential direction press against each other such that a rotational force is easily transmitted from the bushing (from the propeller shaft side) to the cylinder (to the blade side). Furthermore, the reinforcer is disposed between the side surface of the first protrusion in the circumferential direction and the side surface of the second protrusion in the circumferential direction, which is a portion of the bushing relatively likely to wear, and thus an increase in the amount of wear of the bushing is effectively significantly reduced or prevented.

In such a case, the second protrusion of the bushing preferably includes a plurality of second protrusions, and the reinforcer preferably includes a first portion that contacts the second protrusion in a first circumferential direction of the circumferential direction among the second protrusions that are adjacent to each other, a second portion that contacts the second protrusion in a second circumferential direction of the circumferential direction among the second protrusions that are adjacent to each other, and a connector that connects the first portion and the second portion. Here, when the first portion and the second portion of the reinforcer are separate from each other, due to friction between the first portion and the second protrusion, the position of the first portion is conceivably likely to move from a desired position. In addition, due to friction between the second portion and the second protrusion, the position of the second portion is conceivably likely to move from a desired position. On the other hand, according to a preferred embodiment of the present invention, the reinforcer includes the connector that connects the first portion and the second portion such that movement of the first portion is restricted by the second portion being connected to the first portion via the connector, and movement of the second portion is restricted by the first portion being connected to the second portion via the connector. Consequently, movement of the reinforcer (the first portion and the second portion) from a desired position is significantly reduced or prevented.

In an outboard motor including the reinforcer including the connector, when the elastic member elastically deforms in the first circumferential direction of the circumferential direction, the reinforcer preferably contacts the second pressing surface of the second protrusion in the first circumferential direction and is preferably spaced apart from the second pressing surface of the second protrusion in the second circumferential direction, and when the elastic member elastically deforms in the second circumferential direction of the circumferential direction, the reinforcer preferably contacts the second pressing surface of the second protrusion in the second circumferential direction and is preferably spaced apart from the second pressing surface of the second protrusion in the first circumferential direction. When the reinforcer is fixed to both of the second pressing surfaces of the second protrusions on both sides in the circumferential direction, the reinforcer is pressed from both of the second protrusion in the first circumferential direction and the second protrusion in the second circumferential direction, or the reinforcer is pulled away from both of the second protrusion in the first circumferential direction and the second protrusion in the second circumferential direction such that a relatively large stress is conceivably generated in the reinforcer. On the other hand, as described above, when the elastic member elastically deforms in the first circumferential direction of the circumferential direction, the reinforcer contacts the second pressing surface of the second protrusion in the first circumferential direction and is spaced apart from the second pressing surface of the second protrusion in the second circumferential direction such that the reinforcer is not pressed or pulled from both of the second protrusion in the first circumferential direction and the second protrusion in the second circumferential direction, and thus generation of a relatively large stress in the reinforcer is significantly reduced or prevented.

In an outboard motor including the reinforcer including the connector, the reinforcer preferably includes a plurality of reinforcers, and the plurality of reinforcers are preferably separately provided on two opposed side surfaces of the second protrusion in the circumferential direction, respectively. When the reinforcer includes a portion that covers the radially outer peripheral surface of the second protrusion so as to connect the two opposed side surfaces of the second protrusion in the circumferential direction, in order to maintain the shape of the portion, which covers the outer peripheral surface, of the reinforcer connected to one opposed side surface of the second protrusion when a pressing force is generated on the other opposed side surface, the portion of the reinforcer that covers the outer peripheral surface is conceivably pressed or pulled. Thus, a stress is conceivably generated in the portion of the reinforcer that covers the outer peripheral surface. On the other hand, according to a preferred embodiment of the present invention, the plurality of reinforcers are separately provided on the two opposed side surfaces of the second protrusion in the circumferential direction, respectively, such that pressing and pulling between the plurality of separate reinforcers are significantly reduced or prevented, and thus generation of a stress in the reinforcer is significantly reduced or prevented.

In an outboard motor including the bushing including the second protrusion, the reinforcer preferably covers the second pressing surface of the second protrusion and a portion of a radially outer peripheral surface of the second protrusion. Accordingly, the reinforcer covers the portion of the radially outer peripheral surface of the second protrusion so as to contact both the side surface in the circumferential direction and the surface in a radial direction of the second protrusion, and thus movement of the reinforcer not only in the circumferential direction but also in the radial direction from a desired position is significantly reduced or prevented unlike the case in which the reinforcer covers only the second pressing surface, which is the side surface of the second protrusion in the circumferential direction.

In an outboard motor including the bushing including the second protrusion, the reinforcer is preferably plate shaped or substantially plate shaped along at least a portion of an outer peripheral surface of the bushing and at least a portion of the side surface of the second protrusion in the circumferential direction. Accordingly, the reinforcer is easily made by preparing a plate-shaped material.

In such a case, a thickness of a portion pressed by the first pressing surface and the second pressing surface in the reinforcer having the plate shape is preferably smaller than a length of the second protrusion along the circumferential direction. Accordingly, unlike the case in which the thickness of the reinforcer disposed between the first protrusion and the second protrusion is relatively large, a reduction in the movable range between the first protrusion and the second protrusion is significantly reduced or prevented. Consequently, an increase in the frequency of replacement of the damper is significantly reduced or prevented while a reduction in the performance of the damper of the propeller unit is significantly reduced or prevented.

In an outboard motor according to a preferred embodiment of the present invention, a mechanical strength of a metal material of which the reinforcer is made is preferably larger than a mechanical strength of a metal material of which the bushing is made. Accordingly, due to the large mechanical strength of the reinforcer, the life of the damper increases, and thus an increase in the frequency of replacement of the damper is further significantly reduced or prevented.

In such a case, the bushing is preferably made of or includes brass, for example, and the reinforcer is preferably made of or includes stainless steel, for example. Accordingly, it is easy to make the mechanical strength of the reinforcer larger than the mechanical strength of the bushing.

In an outboard motor according to a preferred embodiment of the present invention, the reinforcer is preferably plated with a wear resistant material. Accordingly, the wear resistance of the reinforcer is improved, and thus the life of the damper is further increased. Consequently, an increase in the frequency of replacement of the damper is further significantly reduced or prevented.

In an outboard motor according to a preferred embodiment of the present invention, the damper preferably includes a spacer having an elastic modulus lower than that of the elastic member between the reinforcer and the elastic member in the axial direction of the propeller shaft. When the reinforcer contacts the elastic member in the axial direction, the position of the reinforcer in the axial direction conceivably moves from a desired position. In addition, due to pressing (penetration) of the reinforcer against (into) the elastic member in the axial direction, the elastic member elastically deforms not only in the circumferential direction but also in the axial direction such that the life of the elastic member may conceivably decrease. On the other hand, according to a preferred embodiment of the present invention, the space is provided between the reinforcer and the elastic member such that movement of the reinforcer in a direction toward the elastic member is restricted, and penetration of the reinforcer into the elastic member is significantly reduced or prevented such that a decrease in the life of the elastic member is significantly reduced or prevented.

In such a case, the spacer preferably has an annular shape that surrounds a periphery of the bushing. Accordingly, unlike the case in which a plurality of spacers are separately provided around the bushing, an increase in the number of components of the damper is significantly reduced or prevented. Furthermore, the spacer has an annular shape such that it is easy to dispose the spacer to surround the periphery of the bushing.

In an outboard motor including the spacer, the spacer is preferably plated with a wear resistant material. Accordingly, the wear resistance of the spacer is improved, and thus the life of the spacer is further increased.

In an outboard motor according to a preferred embodiment of the present invention, the reinforcer is preferably attachable to and detachable from the damper. Accordingly, the reinforcer is replaceable separately from the bushing and the elastic member.

According to a preferred embodiment of the present invention, a damper for a propeller unit including a cylinder including a first pressing surface on an inner surface thereof and disposed around a propeller shaft, and a blade disposed radially outward of the cylinder, the damper engaging with the inner surface of the cylinder, and further includes a bushing fixed to a periphery of the propeller shaft and including a second pressing surface that presses the first pressing surface of the cylinder in a circumferential direction, an elastic member disposed around a portion of the bushing different from the second pressing surface of the bushing in an axial direction and that elastically and deformably engages with the inner surface of the cylinder, and a reinforcer provided separately from the bushing and disposed between the first pressing surface and the second pressing surface.

In a damper for a propeller unit according to a preferred embodiment of the present invention, an increase in the amount of wear of the bushing is significantly reduced or prevented such that an increase the frequency of replacement of the damper for a propeller unit is significantly reduced or prevented.

In a damper for a propeller unit according to a preferred embodiment of the present invention, the reinforcer is preferably movable relative to each of the first pressing surface and the second pressing surface. Accordingly, the first pressing surface and the reinforcer rub against each other, and the second pressing surface and the reinforcer rub against each other. Consequently, the amount of friction on the first pressing surface is reduced due to friction between the second pressing surface and the reinforcer (dispersion of friction) as compared with the amount of friction on the first pressing surface generated when the first pressing surface and the second pressing surface directly contact and press against each other. Consequently, an increase in the amount of wear of the first pressing surface (bushing) is further significantly reduced or prevented, and thus an increase in the frequency of replacement of the damper of the propeller unit is further significantly reduced or prevented.

In a damper for a propeller unit according to a preferred embodiment of the present invention, a wear resistance of a material of which the reinforcer is made is preferably higher than a wear resistance of a material of which the bushing is made. Accordingly, the amount of wear of the reinforcer is reduced, and thus the life of the reinforcer is further increased.

The above and other elements, features, steps, characteristics and advantages of preferred embodiments of the present invention will become more apparent from the following detailed description of the preferred embodiments with reference to the attached drawings.

BRIEF DESCRIPTION OF THE DRAWINGS

FIG. 8 is a perspective view showing the structure of a damper according to a preferred embodiment of the present invention.

FIG. 9 is a diagram showing a positional relationship between a bushing-side protrusion, an inner cylinder, and a reinforcer in a state in which an elastic member does not elastically deform according to a preferred embodiment of the present invention.

DETAILED DESCRIPTION OF THE PREFERRED EMBODIMENTS

Preferred embodiments of the present invention are hereinafter described with reference to the drawings.

The structure of an outboard motor 100 according to preferred embodiments of the present invention is now described with reference to FIGS. 1 to 12. In the following description, "forward" and "forward movement direction" represent the direction of "FWD" in FIG. 1, and "rearward" and "rearward movement direction" represent the direction of "BWD" in FIG. 1.

Figure 1:
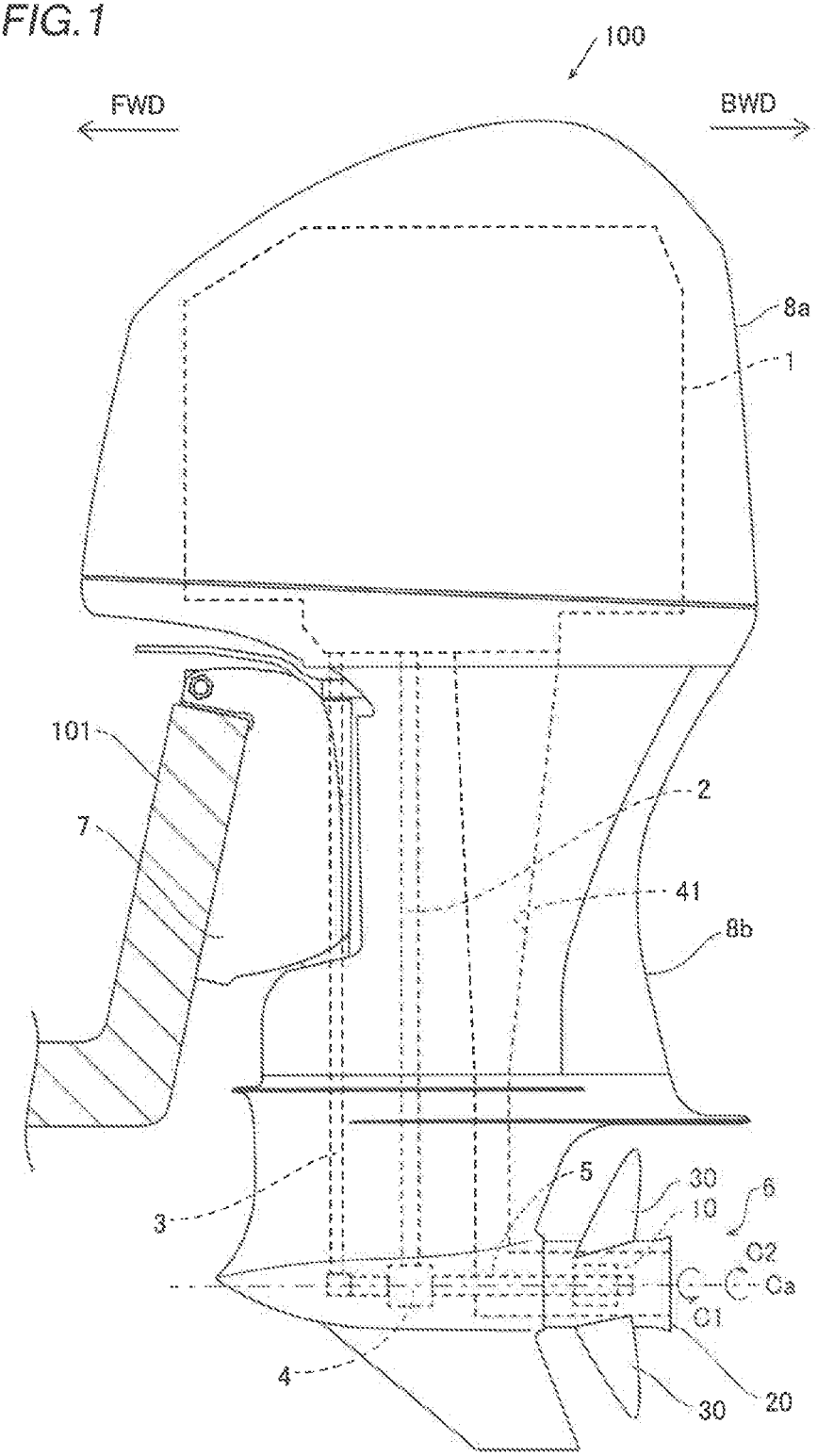
FIG. 1 is a side view showing the overall structure of an outboard motor according to a preferred embodiment of the present invention.

As shown in FIG. 1, the outboard motor 100 is attached to a rearward portion of a hull 101. The outboard motor 100 includes an engine 1, a drive shaft 2, a shift rod 3, a gearing 4, a propeller shaft 5, a propeller unit 6, and a bracket 7. The outboard motor 100 is attached to the hull 101 by the bracket 7.

The outboard motor 100 includes a cowling 8a and a case 8b provided below the cowling 8a. The engine 1 is housed in the cowling 8a. The drive shaft 2, the shift rod 3, the gearing 4, and the propeller shaft 5 are disposed inside the case 8b. The propeller unit 6 is disposed rearward of a lower portion of the case 8b. The bracket 7 is disposed forward of the case 8b.

The engine 1 is preferably an internal combustion engine driven by explosive combustion of fuel such as gasoline or light oil. The drive shaft 2 extends in an upward-downward, and transmits a rotational force of the engine 1. The upper end of the drive shaft 2 is connected to a crankshaft (not shown) of the engine 1. The lower end of the drive shaft 2 is connected to the gearing 4. The gearing 4 is connected to the propeller shaft 5. In the gearing 4, engagement between gears is switched according to the position of the shift rod 3, and a rotational motion from the drive shaft 2 is switched to a state in which the rotational motion is transmitted to the propeller shaft 5 as a rotational motion in a rotational direction (arrow C1 direction) in which a thrust force is generated in the forward movement direction, a state in which the rotational motion is transmitted to the propeller shaft 5 as a rotational motion in a rotational direction (arrow C2 direction) in which a thrust force is generated in the rearward movement direction, or a state in which the rotational motion is not transmitted to the propeller shaft 5 (neutral state).

The propeller shaft 5 extends along a forward-rearward direction. An axis Ca represents the axis of the propeller shaft 5. The propeller shaft 5 transmits the rotational force from the gearing 4 to the propeller unit 6. In addition, the propeller shaft 5 is preferably made of stainless steel, for example.

As shown in FIG. 1, the propeller unit 6 transmits the rotational force from the propeller shaft 5 to a cylinder 20 via a damper 10. The propeller unit 6 generates a thrust force by rotating the cylinder 20 and blades 30 which are integral and unitary with the cylinder 20.

Figure 2:
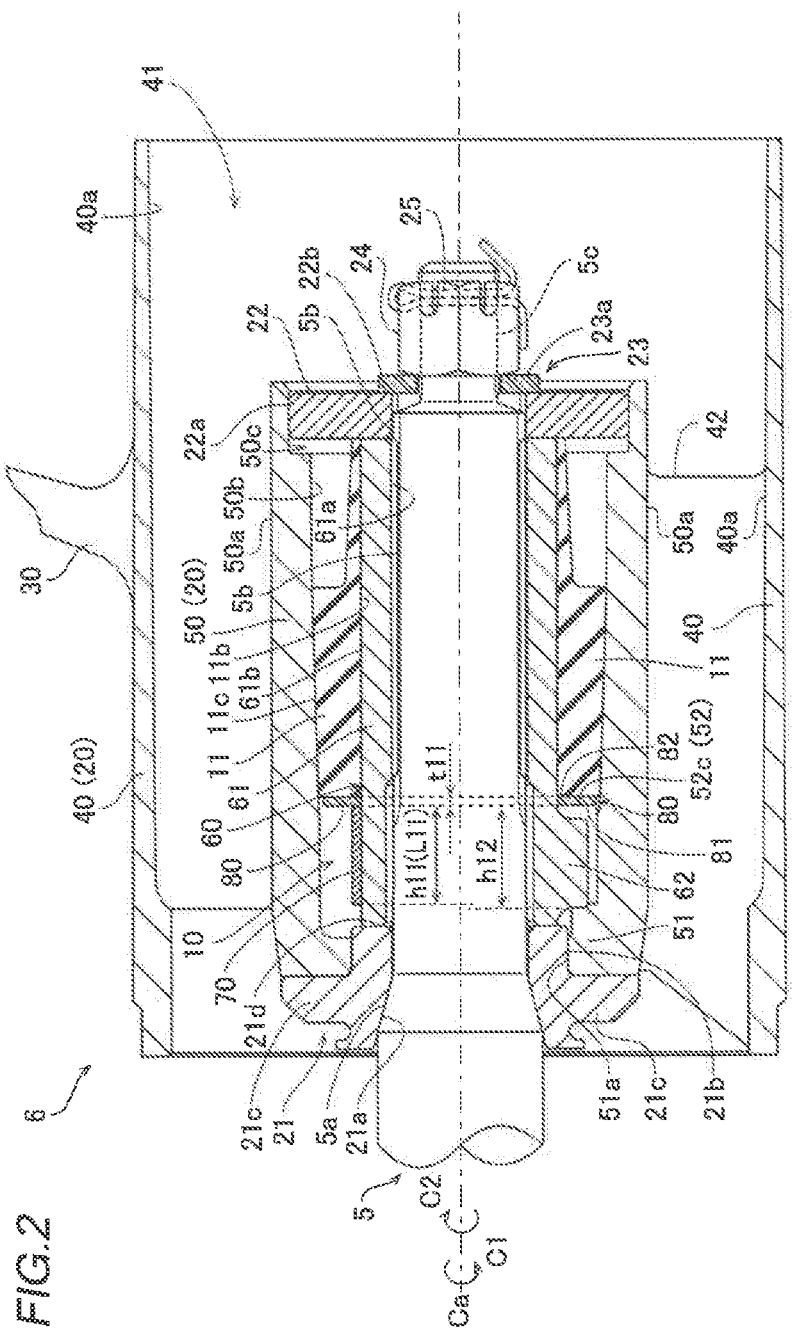
FIG. 2 is a sectional view showing the structure of a propeller unit according to a preferred embodiment of the present invention.

As shown in FIG. 2, the propeller unit 6 surrounds the periphery of the propeller shaft 5. The propeller unit 6 includes the damper 10 disposed around the propeller shaft 5, the cylinder 20 disposed around the damper 10 and that engages with the damper 10, and the blades 30 disposed radially outward of the cylinder 20. The cylinder 20 and the blades 30 are preferably made of a metal material. Preferably, the cylinder 20 and the blades 30 are made of stainless steel, for example. The damper 10 is an example of a "damper of the propeller unit".

In the following description, "outward" and "outer" represent a direction extending radially away from the axis Ca, and "inward" and "inner" represent a direction extending radially toward the axis Ca. In addition, a circumferential direction represents a direction about the axis Ca (the arrow C1 direction or the arrow C2 direction). Furthermore, an axial direction represents a direction along the axis Ca.

Figure 3:
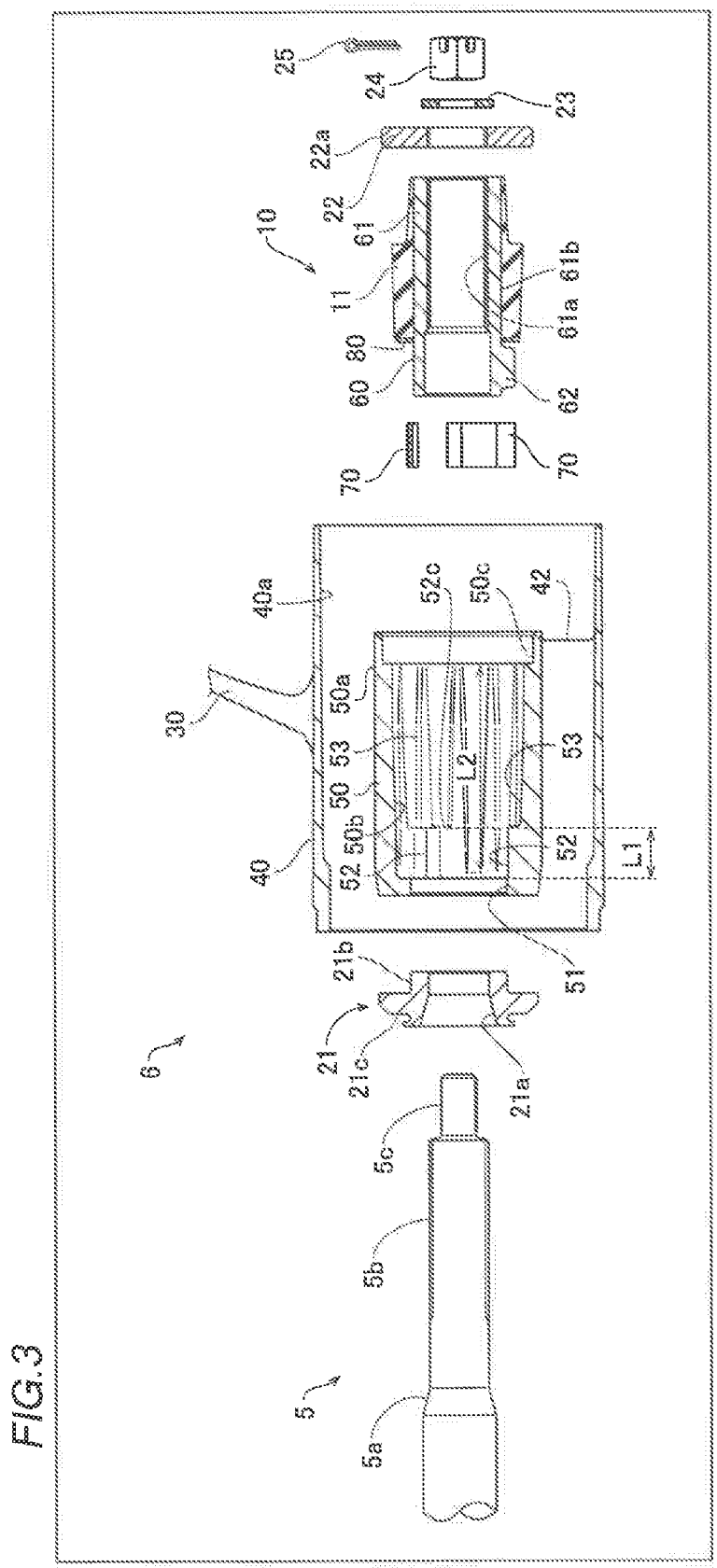
FIG. 3 is an exploded sectional view of a propeller unit according to a preferred embodiment of the present invention.

As shown in FIGS. 2 and 3, the cylinder 20 includes an outer cylinder 40 and an inner cylinder 50 that engages with the damper 10. The outer cylinder 40 has a cylindrical shape that surrounds the inner cylinder 50 in the circumferential direction. A passage 41 through which exhaust air from the engine 1 and cooling water (discharged water) passes is provided between the inner peripheral surface 40a of the outer cylinder 40 and the outer peripheral surface 50a of the inner cylinder 50. The passage 41 opens such that the exhaust air and the cooling water are discharged in the rearward movement direction into the water. In addition, a plurality of (three, for example) ribs 42 extend from the inner peripheral surface 40a of the outer cylinder 40 to the outer peripheral surface 50a of the inner cylinder 50 in the cylinder 20.

The propeller unit 6 includes a forward spacer 21 disposed forward of the damper 10 and the inner cylinder 50, and a rearward spacer 22 disposed rearward of the damper 10 and disposed inward of the inner cylinder 50. The forward spacer 21 surrounds a tapered portion 5a in which the diameter of the propeller shaft 5 gradually and rearwardly decreases. The inner peripheral surface 21a of the forward spacer 21 and the tapered portion 5a are in contact with each other. The rearward spacer 22 is fixed to the outer peripheral surface 5b of the propeller shaft 5. Both the forward spacer 21 and the rearward spacer 22 extend annularly about the axis Ca. The outer peripheral surface 22a of the rearward spacer 22 is disposed parallel or substantially parallel to the inner wall of a spacer positioner 50c of the inner cylinder 50, and a clearance is provided between the inner wall of the spacer positioner 50c and the outer peripheral surface 22a.

At least a surface of the forward spacer 21 and the outer peripheral surface 22a of the rearward spacer 22 are chromium-plated (plated with a wear resistant or hard chromium material).

The propeller unit 6 further includes a washer 23 that contacts the rearward surface 22b of the rearward spacer 22, a nut 24 that contacts the rearward surface 23a of the washer 23 and fastened to a screw 5c of the propeller shaft 5, and a securing pin 25 that secures the nut 24 to the propeller shaft 5. The position of the propeller unit 6 in the frontward-rearward direction with respect to the propeller shaft 5 is restricted (fixed) by the tapered portion 5a, the forward spacer 21, the nut 24, and the securing pin 25.

Figure 4:
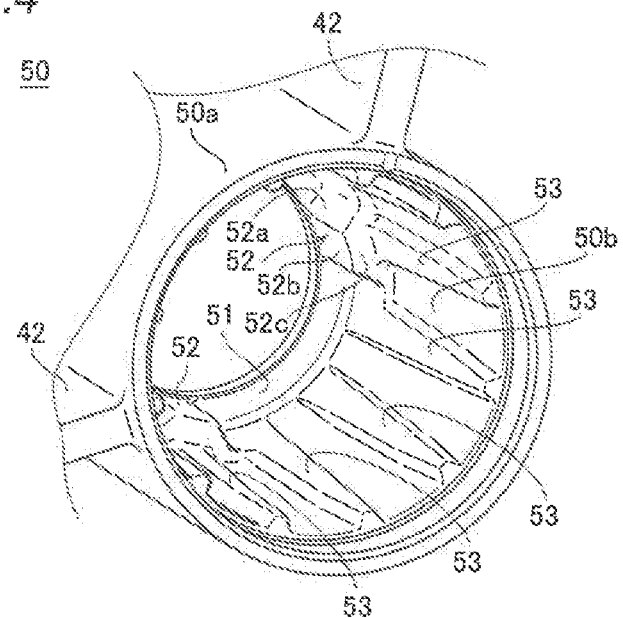
FIG. 4 is a perspective view showing the structure of an inner cylindrical portion according to a preferred embodiment of the present invention.

As shown in FIG. 4, a forward portion of the inner cylinder 50 includes a flange 51 that annularly surrounds the propeller shaft 5 and contacts the outer peripheral surface 21b of the forward spacer 21 (see FIG. 2) and a support 21c that protrudes outward. The inner peripheral surface 51a of the flange 51 and the outer peripheral surface 21b of the forward spacer 21 are in contact with each other. The rearward surface 21d of the forward spacer 21 restricts the positions of a bushing 60 and a reinforcer 70, described below, in the axial direction.

Figure 5:
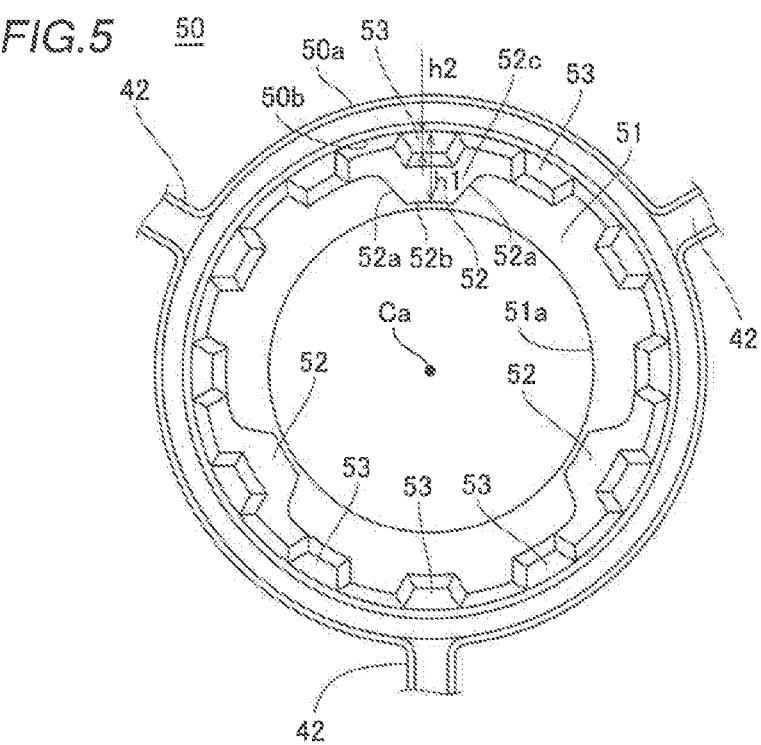
FIG. 5 is a view of an inner cylindrical portion according to a preferred embodiment of the present invention, as viewed in an axial direction.

As shown in FIG. 5, the inner cylinder 50 includes a cylinder-side pressing surface 52a and a cylinder-side protrusion 52 that protrudes radially inward from the inner peripheral surface 50b of the inner cylinder 50. For example, there are a plurality of (three, for example) cylinder-side protrusions 52 disposed at equal or substantially equal angular intervals (120 degree intervals, for example). The protruding height h1 of the cylinder-side protrusion 52 is a length from the inner peripheral surface 50b to the radially inner top surface 52b. In addition, the cross-section of the cylinder-side protrusion 52 viewed in the axial direction (the cross-section defined by the bushing-side pressing surface 52a and the top surface 52b) is trapezoidal shaped or substantially trapezoidal shaped. The inner peripheral surface 50b is an example of an "inner surface of the cylinder".

The cylinder-side protrusion 52 is an example of a "first protrusion". The cylinder-side pressing surface 52a is an example of a "first pressing surface" or a "side surface of the first protrusion in the circumferential direction". The bushing-side pressing surface 62a is an example of a "second pressing surface" or a "side surface of the second protrusion in the circumferential direction". The top surface 62b is an example of a "radially outer peripheral surface of the second protrusion".

The cylinder-side pressing surface 52a and the bushing-side pressing surface 62a (see FIG. 7) described below press against each other in a state in which an elastic member 11 elastically deforms at the maximum operating angle θ (see FIG. 6). As shown in FIG. 2, the rearward surface 52c of the cylinder-side protrusion 52 restricts the positions of the damper 10 and an internal spacer 80 in the axial direction.

Figure 6:
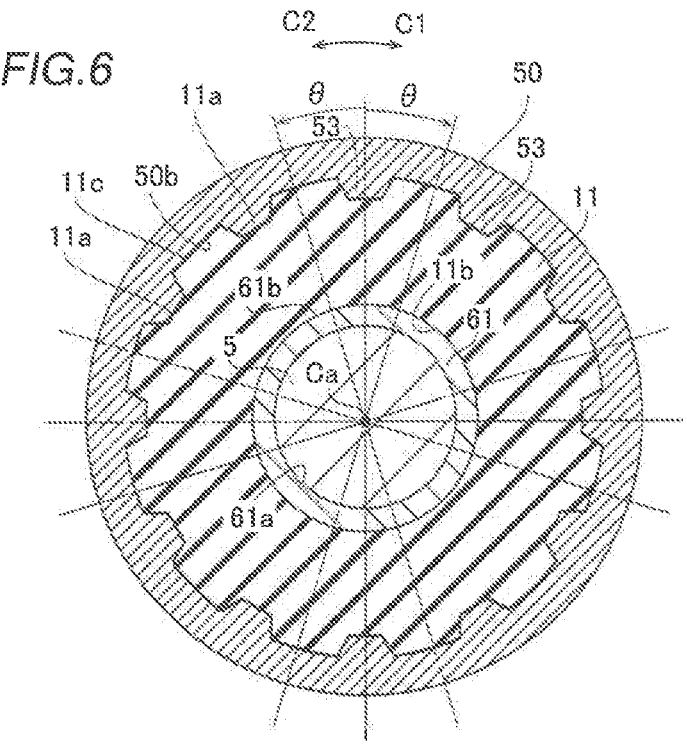
FIG. 6 is a sectional view showing the structure of an elastic member and an inner cylindrical portion according to a preferred embodiment of the present invention.

As shown in FIG. 6, the inner cylinder 50 includes a fitted protrusion 53 fitted into a groove 11a of the elastic member 11 and having a protruding height h2 (see FIG. 5), which is lower than the protruding height h1 of the cylinder-side protrusion 52. The number (twelve, for example) of fitted protrusions 53 is larger than the number of cylinder-side protrusions 52. As shown in FIG. 4, some of the plurality of fitted protrusions 53 continuously extend rearward from the cylinder-side protrusions 52. Both the cylinder-side protrusions 52 and the fitted protrusions 53 extend rearward from the flange 51. The length L1 (see FIG. 3) of the cylinder-side protrusion 52 in the axial direction is smaller than the length L2 of the fitted protrusion 53 in the axial direction.

The damper 10 significantly reduces or prevents transmission of impacts from the propeller shaft 5 to the cylinder 20 (absorbs impacts) due to shift changes (a change in engagement of the gearing 4), and transmission of impacts caused by the unbalanced load applied to a plurality of blades 30 to a main body (the propeller shaft 5, the gearing 4, and the engine 1) of the outboard motor 100 (absorbs impacts). Specifically, as shown in FIG. 6, the damper 10 includes the elastic member 11 that elastically deforms in the circumferential direction while a relative position between the damper 10 and the cylinder 20 in the circumferential direction changes such that the damper 10 absorbs the impacts. Furthermore, the damper 10 is attachable to and detachable from the inner cylinder 50 (cylinder 20), and is a component replaceable from the outboard motor 100.

Figure 7:
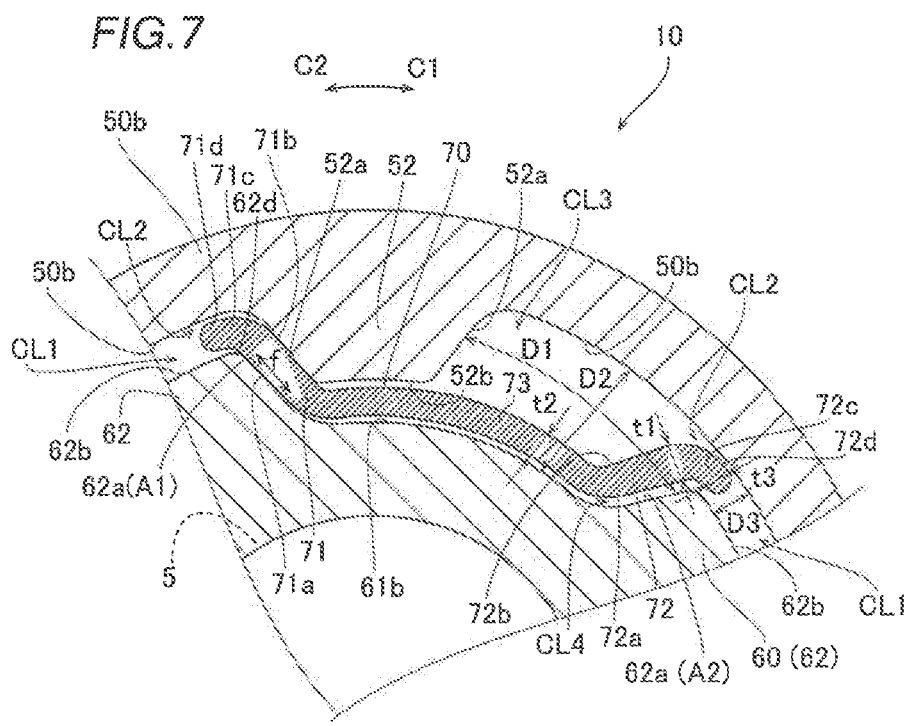
FIG. 7 is a sectional view showing the structure of a reinforcer according to a preferred embodiment of the present invention.

As shown in FIG. 7, the damper 10 is fixed to the periphery of the propeller shaft 5, and includes the bushing 60 including the bushing-side pressing surface 62a that presses the cylinder-side pressing surface 52a of the inner peripheral surface 50b of the inner cylinder 50 in the circumferential direction and the reinforcer 70 separate from the bushing 60 and disposed between the cylinder-side pressing surface 52a and the bushing-side pressing surface 62a. As shown in FIG. 6, the elastic member 11 is disposed around a portion (rearward portion) of the bushing 60 different from the bushing-side pressing surface 62a of the bushing 60 in the axial direction, and elastically and deformably engages with the fitted protrusions 53 of the inner peripheral surface 50b of the inner cylinder 50.

As shown in FIG. 2, the bushing 60 is splined and fixed to the outer peripheral surface 5b of the propeller shaft 5. Thus, the bushing 60 rotates integrally with the propeller shaft 5. The bushing 60 is preferably made of brass as a metal material, for example. The bushing 60 includes a cylinder 61 and a bushing-side protrusion 62 that protrudes outward from a forward portion of the cylinder 61. Furthermore, a surface of the bushing 60 (at least the bushing-side pressing surface 62a, and preferably the entire surface of the bushing 60) is chromium-plated (plated with a wear resistant material).

The cylinder 61 has a cylindrical shape that extends along the axis Ca so as to cover the outer peripheral surface 5b of the propeller shaft 5. The inner peripheral surface 61a of the cylinder 61 is splined to the outer peripheral surface 5b of the propeller shaft 5. The elastic member 11 is disposed on the outer peripheral surface 61b of the cylinder 61.

As shown in FIG. 9, the bushing-side protrusion 62 includes the bushing-side pressing surface 62a. The bushing-side protrusion 62 protrudes toward the inner peripheral surface 50b of the inner cylinder 50. Furthermore, the bushing-side protrusion 62 has a width W1 in the circumferential direction (a distance between bushing-side pressing surfaces 62a on both sides in the circumferential direction). As shown in FIG. 7, a clearance CL1 is provided between the top surface 62b, which is the outer peripheral surface of the bushing-side protrusion 62, and the inner peripheral surface 50b of the inner cylinder 50. The cross-section of the bushing-side protrusion 62 viewed in the axial direction (the cross-section defined by the bushing-side pressing surface 62a and the top surface 62b) is trapezoidal shaped or substantially trapezoidal shaped (e.g., substantially rectangular).

A plurality of bushing-side protrusions 62 are provided, and the number (three, for example) of the bushing-side protrusions 62 is equal to the number of cylinder-side protrusions 52, for example. The plurality of bushing-side protrusions 62 are disposed at equal or substantially equal angular intervals (120 degree intervals, for example).

The maximum operating angle θ of the damper 10 corresponds to the movable angle range of the bushing 60 in the circumferential direction with respect to the cylinder 20. That is, the movable range of the relative angle of the bushing-side protrusion 62 to the cylinder-side protrusion 52 is the maximum operating angle θ. The maximum operating angle θ is a size based on a distance D1 (see FIG. 7) between the reinforcer 70 and the cylinder-side pressing surface 52a of the cylinder-side protrusion 52 in the circumferential direction. Note that the operating angle represents the rotation angle of the bushing 60 in the arrow C1 direction or the arrow C2 direction with respect to the cylinder 20 due to elastic deformation of the elastic member 11. Furthermore, the distance D1 represents a distance between a contact surface 71b or 72b (the contact surface 72b in FIG. 7) of the reinforcer 70 and the cylinder-side pressing surface 52a in a state in which the elastic member 11 elastically deforms in one direction of the circumferential direction.

As shown in FIG. 7, the reinforcer 70 is separate from the bushing 60, and increases (reinforces) the mechanical strength of the bushing-side protrusion 62 (damper 10). Specifically, the reinforcer 70 is disposed between the cylinder-side protrusion 52 and the bushing-side protrusion 62 in the circumferential direction, and is preferably plate shaped or substantially plate shaped along the bushing-side pressing surface 62a and the outer peripheral surface 61b of the bushing 60. The reinforcer 70 is not fixed to the bushing 60 or the inner cylinder 50 by a securing device or adhesive, for example, and is movable with respect to and detachable from the damper 10.

The mechanical strength of a metal material of which the reinforcer 70 is made is preferably larger than the mechanical strength of the metal material of which the bushing 60 is made. The mechanical strength indicates at least one of wear resistance, hardness (Brenner hardness or Vickers hardness), tensile strength, and bending strength, for example. Specifically, the wear resistance of the material of which the reinforcer 70 is made is higher than the wear resistance of the material of which the bushing 60 is made. Specifically, the reinforcer 70 is made of stainless steel, for example, as a metal material having a mechanical strength higher than that of brass of which the bushing 60 is made.

A surface (at least contact surfaces 71a, 71b, 72a, and 72b) of the reinforcer 70 is plated with a wear resistant material. For example, the reinforcer 70 is chromium-plated. Preferably, the entire surface of the reinforcer 70 is plated with chromium or another wear resistant material.

As shown in FIG. 8, a plurality of reinforcers 70 are provided, and the number (three, for example) of the reinforcers 70 is equal to the number of bushing-side protrusions 62, for example. As shown in FIG. 9, the plurality of reinforcers 70 are separately provided on the bushing-side pressing surfaces 62a of the bushing-side protrusion 62 on both sides in the circumferential direction, respectively.

The bushing-side pressing surfaces 62a of the bushing-side protrusion 62 are covered with the plurality of reinforcers 70 whereas a portion of the top surface 62b of the bushing-side protrusion 62 is exposed from the reinforcer 70. In other words, the reinforcer 70 covers the bushing-side pressing surface 62a of the bushing-side protrusion 62 and a portion of the top surface 62b, which is the outer peripheral surface of the bushing 60, i.e., the radially outer peripheral surface of the bushing-side protrusion 62. As shown in FIG. 2, the height h11 of the reinforcer 70 in the axial direction from the internal spacer 80 is equal or substantially equal to the height h12 of the bushing-side protrusion 62 in the axial direction from the internal spacer 80. The term "substantially equal" indicates that a difference between the height h11 and the height h12 is within a range of about 30% or less of the height h12, for example.

As shown in FIG. 7, the reinforcer 70 includes a first portion 71 that contacts the bushing-side protrusion 62 in a first circumferential direction (arrow C2 direction) of the circumferential direction among the bushing-side protrusions 62 that are adjacent to each other, a second portion 72 that contacts the bushing-side protrusion 62 in a second circumferential direction (arrow C1 direction) of the circumferential direction among the bushing-side protrusions 62 that are adjacent to each other, and a connector 73 that connects the first portion 71 and the second portion 72. The first portion 71, the second portion 72, and the connector 73 are preferably continuous (integral and unitary). The first portion 71 and the second portion 72 are examples of "portions pressed by the first pressing surface and the second pressing surface".

The first portion 71 and the second portion 72 include the contact surfaces 71a and 72a that contact the bushing-side pressing surfaces 62a, and the contact surfaces 71b and 72b that contact the cylinder-side pressing surfaces 52a. As described below, when one of the contact surfaces 71b and 72b is in contact with the cylinder-side pressing surface 52a, the other is not in contact with the cylinder-side pressing surface 52a.

The first portion 71 is provided along a corner 62d of the bushing-side protrusion 62, which is a boundary between the bushing-side pressing surface 62a and the top surface 62b, and includes a first cover 71c that covers a portion of the top surface 62b in the vicinity of its end in the circumferential direction. Similarly to the first portion 71, the second portion 72 includes a second cover 72c that covers a portion of the top surface 62b in the vicinity of its end in the circumferential direction.

A clearance CL2 is provided between the outer peripheral surface 71d of the first cover 71c and the inner peripheral surface 50b, and between the outer peripheral surface 72d of the second cover 72c and the inner peripheral surface 50b. Thus, the reinforcer 70 is radially movable relative to the bushing 60 and the inner cylinder 50. That is, the reinforcer 70 is movable in the radial direction and the circumferential direction relative to each of the cylinder-side pressing surface 52a and the bushing-side pressing surface 62a.

As shown in FIG. 7, in the plate-shaped reinforcer 70, the thicknesses t1 of the first portion 71 and the second portion 72, which are portions pressed by the bushing-side pressing surface 62a and the cylinder-side pressing surface 52a, are smaller than the width W1 (see FIG. 9) of the bushing-side protrusion 62 along the circumferential direction. In addition, the thicknesses t1 are smaller than the distance D1 between the cylinder-side pressing surface 52a and the bushing-side pressing surface 62a. The thickness t2 of the connector 73 of the reinforcer 70 is smaller than a distance D2 between the outer peripheral surface 61b of the bushing 60 and the inner peripheral surface 50b of the inner cylinder 50. Thus, a clearance CL3 is provided between the connector 73 and the cylinder-side protrusion 52 in the radial direction.

Figure 10:
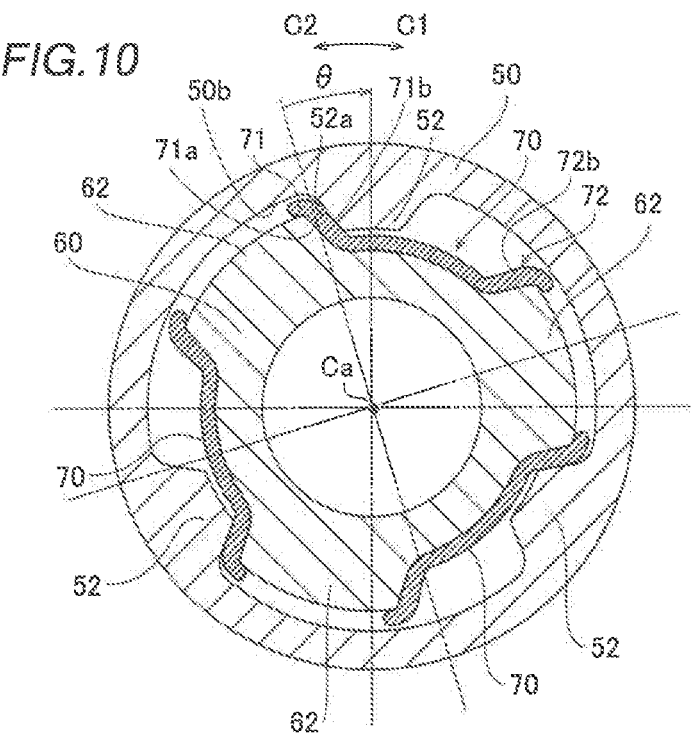
FIG. 10 is a diagram showing a positional relationship between a bushing-side protrusion, an inner cylinder, and a reinforcer in a state in which an elastic member elastically deforms in a first circumferential direction according to a preferred embodiment of the present invention.

As shown in FIGS. 7 and 10, when the elastic member 11 elastically deforms in the first circumferential direction (arrow C2 direction) of the circumferential direction such that the bushing 60 moves in the arrow C1 direction, the reinforcer 70 contacts the bushing-side pressing surface 62a (reference numeral A1) of the bushing-side protrusion 62 in the arrow C2 direction and is spaced apart from the bushing-side pressing surface 62a (reference numeral A2) of the bushing-side protrusion 62 in the arrow C1 direction. When the elastic member 11 elastically deforms in the second circumferential direction (arrow C1 direction) of the circumferential direction, the reinforcer 70 contacts the bushing-side pressing surface 62a (reference numeral A2) of the bushing-side protrusion 62 in the arrow C1 direction and is spaced apart from the bushing-side pressing surface 62a (reference numeral A1) of the bushing-side protrusion 62 in the arrow C2 direction.

Specifically, as shown in FIG. 10, the elastic member 11 elastically deforms such that when the propeller shaft 5 (bushing 60) moves in the circumferential direction relative to the cylinder 20 (inner cylinder 50) at the maximum operating angle θ in the arrow C1 direction, the contact surface 71b of the first portion 71 of the reinforcer 70 and the cylinder-side pressing surface 52a of the cylinder-side protrusion 52 contact with each other. At this time, the contact surface 72b of the second portion 72 is spaced apart from the cylinder-side pressing surface 52a of the cylinder-side protrusion 52.

As shown in FIG. 7, the first portion 71 is disposed between the cylinder-side protrusion 52 and the bushing-side protrusion 62, the contact surface 71a and the bushing-side pressing surface 62a slide (see arrow f) with respect to each other, and the contact surface 71b and the bushing-side pressing surface 62a slide (see arrow f) with respect to each other. Thus, the reinforcer 70 moves along the cylinder-side pressing surface 52a and the bushing-side pressing surface 62a (the clearance CL2 decreases in size).

Figure 11:
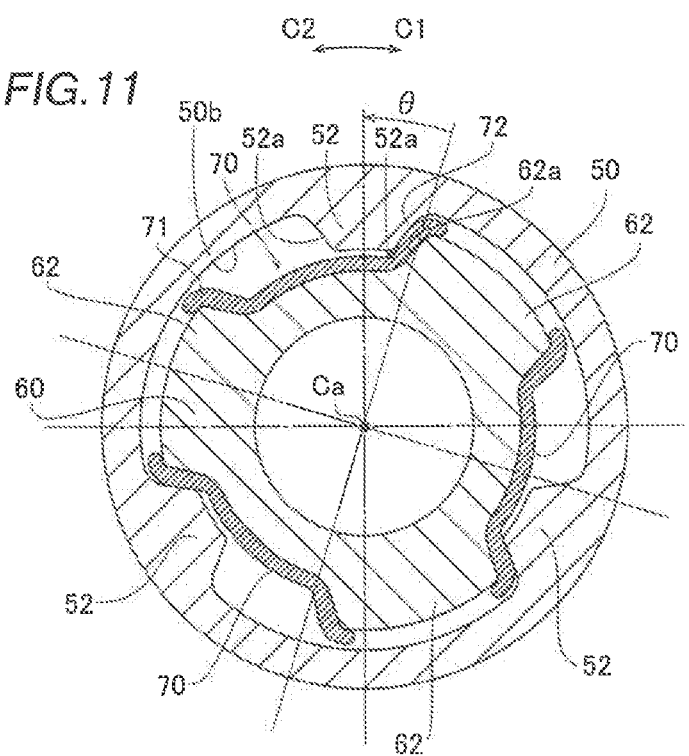
FIG. 11 is a diagram showing a positional relationship between a bushing-side protrusion, an inner cylinder, and a reinforcer in a state in which an elastic member elastically deforms in a second circumferential direction according to a preferred embodiment of the present invention.

The contact surface 72a of the second portion 72 is spaced apart from the bushing-side pressing surface 62a such that a clearance CL4 is provided between the contact surface 72a and the bushing-side pressing surface 62a. As shown in FIG. 11, the case in which the elastic member 11 elastically deforms such that the propeller shaft 5 (bushing 60) moves in the circumferential direction relative to the cylinder 20 (inner cylinder 50) at the maximum operating angle θ in the arrow C2 direction is the same in structure as the case of the relative movement in the arrow C1 direction described above, and thus description thereof is omitted.

The elastic member 11 is made of an elastic material such as rubber or resin, for example. As shown in FIG. 2, the inner peripheral surface 11b of the elastic member 11 is fixed to the outer peripheral surface 61b of the bushing 60 by vulcanization adhesion, for example. Thus, the inner peripheral surface 11b of the elastic member 11 rotates integrally with the bushing 60.

As shown in FIG. 8, the outer peripheral surface 11c of the elastic member 11 includes a plurality of grooves 11a provided along the axial direction and into which the fitted protrusions 53 of the inner cylinder 50 are fitted. For example, the fitted protrusions 53 are press-fitted into the grooves 11a such that relative positions between the grooves 11a and the inner cylinder 50 are fixed. A rotational force is applied to the bushing 60 or the inner cylinder 50 so as to relatively move the grooves 11a and the inner peripheral surface 11b of the elastic member 11 in the circumferential direction such that the elastic member 11 elastically deforms in the circumferential direction.

As shown in FIG. 8, the damper 10 includes the internal spacer 80 disposed rearward of the bushing-side protrusions 62 of the bushing 60 and the reinforcer 70 in the axial direction and disposed on a portion of the outer peripheral surface 61b forward of a portion in which the elastic member 11 is disposed. That is, the internal spacer 80 is disposed between the reinforcer 70 and the elastic member 11.

The internal spacer 80 is made of a material having an elastic modulus lower than that of the elastic member 11. The internal spacer 80 is preferably made of a metal material having an elastic modulus lower than those of rubber and a resin material, and is made of stainless steel or aluminum (or an aluminum alloy), for example. In addition, a surface of the internal spacer 80 is plated with a wear resistant material, for example, chromium-plated.

Figure 12:
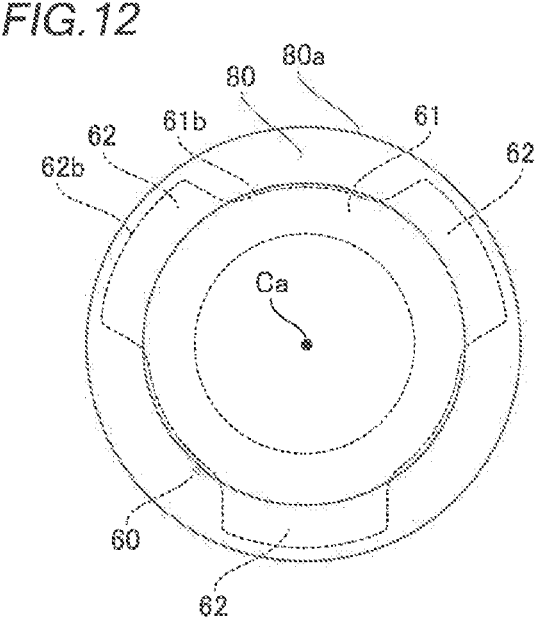
FIG. 12 is a diagram of the structure of an internal spacer according to a preferred embodiment of the present invention, as viewed in an axial direction.

As shown in FIG. 12, the internal spacer 80 has an annular shape that surrounds the periphery of the bushing 60. For example, the internal spacer 80 preferably has an annular flat plate shape. The outer peripheral surface 80a of the internal spacer 80 is disposed radially outward of the top surfaces 62b of the bushing-side protrusions 62, and is disposed radially inward of the grooves 11a of the elastic member 11. As shown in FIG. 2, the internal spacer 80 has a thickness t2. The thickness t2 is smaller than the length L11 (the size of the height h11) of the reinforcer 70 in the axial direction, and is smaller than the thickness t1.

The forward surface 81 of the internal spacer 80 contacts the rearward end of the reinforcer 70 and the rearward surface 52c of the inner cylinder 50. In addition, the rearward surface 82 of the internal spacer 80 contacts the forward surface 11d of the elastic member 11.

The operation of the outboard motor 100 (damper 10) according to the preferred embodiments of the present invention is now described with reference to FIGS. 6, 9, 10, and 11.

Transmission of a rotational force in the arrow C1 direction from the engine 1 to the propeller shaft 5 is started from a state (FIG. 9) in which a rotational force is not transmitted from the engine 1 to the propeller shaft 5 such that the propeller shaft 5 and the bushing 60 integrally rotate in the arrow C1 direction, as shown in FIG. 10.

Then, the bushing 60 and the inner peripheral surface 11b of the elastic member 11 fixed to the outer peripheral surface 61b of the bushing 60 integrally rotate, while a reaction force from the water caused by rotation of the blades 30 is generated in the arrow C2 direction in the cylinder 20 (inner cylinder 50). Thus, the elastic member 11 elastically deforms such that relative positions in the circumferential direction between the grooves 11a, into which the fitted protrusions 53 of the inner cylinder 50 are fitted as shown in FIG. 6, and the inner peripheral surface 11b of the elastic member 11 change.

Then, when the relative position between the bushing 60 and the inner cylinder 50 in the circumferential direction deviates by the maximum operating angle θ due to elastic deformation of the elastic member 11, as shown in FIG. 10, the reinforcer 70 (first portion 71) is sandwiched between the bushing-side pressing surface 62a and the cylinder-side pressing surface 52a. Thus, the bushing-side pressing surface 62a and the cylinder-side pressing surface 52a press against each other via the reinforcer 70 (first portion 71), and the rotational force (torque) is thus transmitted. In addition, the second portion 72 is spaced apart from at least the cylinder-side pressing surface 52a of the cylinder-side pressing surface 52a and the bushing-side pressing surface 62a. Preferably, the reinforcer 70 moves in the radial direction and the circumferential direction such that the second portion 72 is spaced apart from both the cylinder-side pressing surface 52a and the bushing-side pressing surface 62a.

Then, the rotational force is transmitted to the cylinder 20 such that the blades 30 integral and unitary with the cylinder 20 are rotated in the arrow C1 direction, the water around the blades 30 is pushed rearward, and a thrust force is generated to push the hull 101 in the forward movement direction. When impacts (the unbalanced load in the circumferential direction between the plurality of blades 30) take place in the blades 30, for example, the relative position between the bushing 60 and the inner cylinder 50 in the circumferential direction changes, and the impacts are absorbed by the elastic member 11.

When the rotational direction of the propeller shaft 5 is changed to the arrow C2 direction by the shift rod 3, the propeller shaft 5 and the bushing 60 integrally rotate in the arrow C2 direction, as shown in FIG. 11. Then, the elastic member 11 elastically deforms such that the relative position between the bushing 60 and the inner cylinder 50 in the circumferential direction deviates by the maximum operating angle θ in the arrow C2 direction. At this time, the elastic member 11 elastically deforms such that impacts caused by the shift change are absorbed.

Then, the reinforcer 70 (second portion 72) is sandwiched between the bushing-side pressing surface 62a and the cylinder-side pressing surface 52a. Thus, the bushing-side pressing surface 62a and the cylinder-side pressing surface 52a press against each other via the reinforcer 70 (second portion 72), and thus the rotational force (torque) is transmitted. In addition, the first portion 71 is spaced apart from at least the cylinder-side pressing surface 52a of the cylinder-side pressing surface 52a and the bushing-side pressing surface 62a. Preferably, the reinforcer 70 moves in the radial direction and the circumferential direction such that the first portion 71 is spaced apart from both the cylinder-side pressing surface 52a and the bushing-side pressing surface 62a. Then, the rotational force is transmitted to the cylinder 20 such that the blades 30 integral and unitary with the cylinder 20 are rotated in the arrow C2 direction, the water around the blades 30 is pushed forward, and a thrust force is generated to push the hull 101 in the rearward movement direction.

According to the various preferred embodiments of the present invention described above, the following advantageous effects are achieved.

According to a preferred embodiment of the present invention, the reinforcer 70 provided separately from the bushing 60 and disposed between the cylinder-side pressing surface 52a and the bushing-side pressing surface 62a is provided in the damper 10. Accordingly, the cylinder-side pressing surface 52a and the bushing-side pressing surface 62a press against each other via the reinforcer 70. Consequently, the bushing-side pressing surface 62a and the reinforcer 70 rub against each other without the cylinder-side pressing surface 52a rubbing the bushing-side pressing surface 62a due to direct contact therebetween, and thus an increase in the amount of wear of the cylinder-side pressing surface 52a is significantly reduced or prevented. Consequently, an increase in the amount of wear of the cylinder-side pressing surface 52a (bushing) is significantly reduced or prevented as compared with the case in which the cylinder-side pressing surface 52a and the bushing-side pressing surface 62a directly contact and rub against each other. Consequently, an increase in the frequency of replacement of the damper 10 of the propeller unit 6 is significantly reduced or prevented.

According to a preferred embodiment of the present invention, the reinforcer 70 is movable relative to each of the cylinder-side pressing surface 52a and the bushing-side pressing surface 62a. Accordingly, the cylinder-side pressing surface 52a and the reinforcer 70 rub against each other, and the bushing-side pressing surface 62a and the reinforcer 70 rub against each other. Consequently, the amount of friction on the cylinder-side pressing surface 52a is reduced due to friction between the bushing-side pressing surface 62a and the reinforcer 70 (dispersion of friction) as compared with the amount of friction generated on the cylinder-side pressing surface 52a when the cylinder-side pressing surface 52a and the bushing-side pressing surface 62a directly contact and press against each other. Consequently, an increase in the amount of wear of the cylinder-side pressing surface 52a (bushing) is further significantly reduced or prevented, and thus an increase in the frequency of replacement of the damper 10 of the propeller unit 6 is further significantly reduced or prevented.

According to a preferred embodiment of the present invention, the wear resistance of the material of which the reinforcer 70 is made is higher than the wear resistance of the material of which the bushing 60 is made. Accordingly, the amount of wear of the reinforcer 70 is reduced, and thus the life of the reinforcer 70 is further increased.

According to a preferred embodiment of the present invention, the cylinder 20 includes the cylinder-side protrusions 52, which include the cylinder-side pressing surfaces 52a, that protrude radially inward from the inner peripheral surface 50b of the cylinder 20. Furthermore, the bushing 60 includes the bushing-side protrusions 62, which include the bushing-side pressing surfaces 62a, that protrude toward the inner peripheral surface 50b of the cylinder 20. In addition, the reinforcer 70 is disposed between the cylinder-side pressing surface 52a defining a side surface of the cylinder-side protrusion 52 in the circumferential direction and the bushing-side pressing surface 62a defining a side surface of the bushing-side protrusion 62 in the circumferential direction. Accordingly, the side surface of the cylinder-side protrusion 52 in the circumferential direction and the side surface of the bushing-side protrusion 62 in the circumferential direction press against each other such that the rotational force is easily transmitted from the bushing 60 (from the propeller shaft 5 side) to the cylinder 20 (to the blade 30 side). Furthermore, the reinforcer 70 is disposed between the side surface of the cylinder-side protrusion 52 in the circumferential direction and the side surface of the bushing-side protrusion 62 in the circumferential direction, which is a portion of the bushing 60 relatively likely to wear, and thus an increase in the amount of wear of the bushing 60 is effectively significantly reduced or prevented.

According to a preferred embodiment of the present invention, the bushing 60 includes the plurality of bushing-side protrusions 62. Furthermore, the reinforcer 70 includes the first portion 71 that contacts the bushing-side protrusion 62 in the first circumferential direction of the circumferential direction among the bushing-side protrusions 62 that are adjacent to each other, the second portion 72 that contacts the bushing-side protrusion 62 in the second circumferential direction of the circumferential direction among the bushing-side protrusions 62 that are adjacent to each other, and the connector 73 that connects the first portion 71 and the second portion 72. Accordingly, movement of the first portion 71 is restricted by the second portion 72 being connected to the first portion 71 via the connector 73, and movement of the second portion 72 is restricted by the first portion 71 being connected to the second portion via the connector 73. Consequently, movement of the reinforcer 70 (the first portion 71 and the second portion 72) from a desired position is significantly reduced or prevented.

According to a preferred embodiment of the present invention, when the elastic member 11 elastically deforms in the first circumferential direction of the circumferential direction, the reinforcer 70 contacts the bushing-side pressing surface 62a of the bushing-side protrusion 62 in the first circumferential direction and is spaced apart from the bushing-side pressing surface 62a of the bushing-side protrusion 62 in the second circumferential direction, and when the elastic member 11 elastically deforms in the second circumferential direction of the circumferential direction, the reinforcer 70 contacts the bushing-side pressing surface 62a of the bushing-side protrusion 62 in the second circumferential direction and is spaced apart from the bushing-side pressing surface 62a of the bushing-side protrusion 62 in the first circumferential direction. Accordingly, the reinforcer 70 is not pressed or pulled from both of the bushing-side protrusion 62 in the first circumferential direction and the bushing-side protrusion 62 in the second circumferential direction, and thus generation of a relatively large stress in the reinforcer 70 is significantly reduced or prevented.

According to a preferred embodiment of the present invention, the outboard motor 100 includes the plurality of reinforcers 70, and the plurality of reinforcers 70 are separately provided on two opposed side surfaces (bushing-side pressing surfaces 62a) of the bushing-side protrusion 62 in the circumferential direction, respectively. Accordingly, pressing and pulling between the plurality of separate reinforcers 70 are significantly reduced or prevented, and thus generation of a stress in the reinforcer 70 is significantly reduced or prevented.

According to a preferred embodiment of the present invention, the reinforcer 70 covers the bushing-side pressing surface 62a of the bushing-side protrusion 62 and the portion of the top surface 62b, which is the radially outer peripheral surface of the bushing-side protrusion 62. Accordingly, the reinforcer 70 covers the portion of the top surface 62b of the bushing-side protrusion 62 so as to contact both the bushing-side pressing surface 62a and the top surface 62b of the bushing-side protrusion 62, and thus movement of the reinforcer 70 not only in the circumferential direction but also in the radial direction from a desired position is significantly reduced or prevented unlike the case in which the reinforcer 70 covers only the bushing-side pressing surface 62a, which is the side surface of the bushing-side protrusion 62 in the circumferential direction.

According to a preferred embodiment of the present invention, the reinforcer 70 is preferably plate shaped or substantially plate shaped along at least a portion of the outer peripheral surface 61b of the bushing 60 and at least a portion of the bushing-side pressing surface 62a, which is the side surface of the bushing-side protrusion 62 in the circumferential direction. Accordingly, the reinforcer 70 is easily made from a plate-shaped material.

According to a preferred embodiment of the present invention, the thicknesses t1 of the first portion 71 and the second portion 72 pressed by the cylinder-side pressing surface 52a and the bushing-side pressing surface 62a in the reinforcer 70 is smaller than the width W1 of the bushing-side protrusion 62 along the circumferential direction. Accordingly, unlike the case in which the thickness t1 of the reinforcer 70 disposed between the cylinder-side protrusion 52 and the bushing-side protrusion 62 is relatively large, a reduction in the movable range (maximum operating angle θ) between the cylinder-side protrusion 52 and the bushing-side protrusion 62 is significantly reduced or prevented. Consequently, an increase in the frequency of replacement of the damper 10 is significantly reduced or prevented while a reduction in the performance of the damper 10 of the propeller unit 6 is significantly reduced or prevented.

According to a preferred embodiment of the present invention, the mechanical strength of the metal material of which the reinforcer 70 is made is larger than the mechanical strength of the metal material of which the bushing 60 is made. Accordingly, due to the large mechanical strength of the reinforcer 70, the life of the damper 10 increases, and thus an increase in the frequency of replacement of the damper 10 is further significantly reduced or prevented.

According to a preferred embodiment of the present invention, the bushing 60 is preferably made of brass, for example, and the reinforcer 70 is preferably made of stainless steel, for example. Accordingly, it is easy to make the mechanical strength of the reinforcer 70 larger than the mechanical strength of the bushing 60.

According to a preferred embodiment of the present invention, the reinforcer 70 is preferably plated with a wear resistant material. Accordingly, the wear resistance of the reinforcer 70 is improved, and thus the life of the damper 10 is further increased. Consequently, an increase in the frequency of replacement of the damper 10 is further significantly reduced or prevented.

According to a preferred embodiment of the present invention, the damper 10 includes the internal spacer 80 having an elastic modulus lower than that of the elastic member 11 between the reinforcer 70 and the elastic member 11 in the axial direction of the propeller shaft 5. Accordingly, movement of the reinforcer 70 in a direction toward the elastic member 11 is restricted, and penetration of the reinforcer 70 into the elastic member 11 is significantly reduced or prevented such that a decrease in the life of the elastic member 11 is significantly reduced or prevented.

According to a preferred embodiment of the present invention, the internal spacer 80 has an annular shape that surrounds the periphery of the bushing 60. Accordingly, unlike the case in which a plurality of internal spacers 80 are separately provided around the bushing 60, an increase in the number of components of the damper 10 is significantly reduced or prevented. Furthermore, the internal spacer 80 has an annular shape such that it is easy to dispose the internal spacer 80 to surround the periphery of the bushing 60.

According to a preferred embodiment of the present invention, the internal spacer 80 is preferably plated with a wear resistant material. Accordingly, the wear resistance of the internal spacer 80 is improved, and thus the life of the internal spacer 80 is further increased.

According to a preferred embodiment of the present invention, the reinforcer 70 is attachable to and detachable from the damper 10. Accordingly, the reinforcer 70 is replaceable separately from the bushing 60 and the elastic member 11. Thus, the life of the outboard motor 100 is further increased.

The preferred embodiments of the present invention described above are illustrative in all points and not restrictive. The extent of the present invention is not defined by the above description of the preferred embodiments but by the scope of the claims, and all modifications (modified examples) within the meaning and range equivalent to the scope of the claims are further included.

Figure 13:
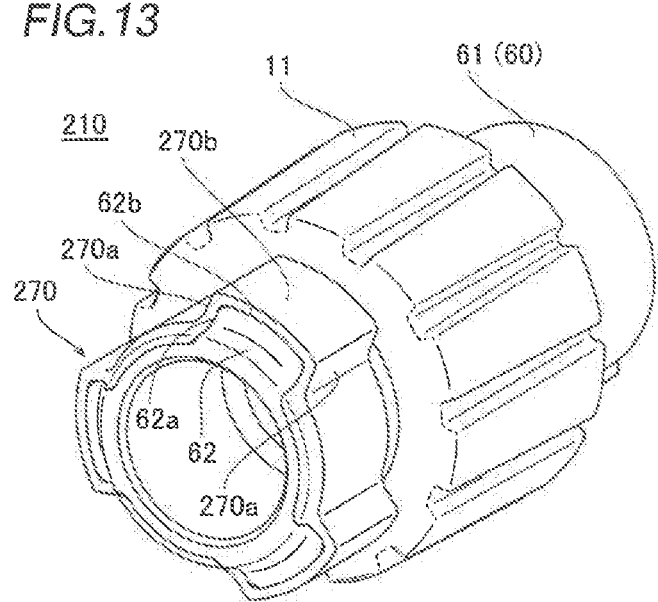
FIG. 13 is a perspective view showing the structure of a damper according to a first modified example of a preferred embodiment of the present invention.

For example, while the damper preferably includes the plurality of reinforcers in the preferred embodiments described above, the present invention is not restricted to this. For example, as in a damper 210 according to a first modified example shown in FIG. 13, the damper may alternatively include one reinforcer 270. Specifically, the reinforcer 270 of the damper 210 has an annular shape as viewed in an axial direction. The reinforcer 270 includes a portion 270a that covers a bushing-side pressing surface 62a and a portion 270b integral and unitary with the portion 270a that covers a top surface 62b.

Figure 14:
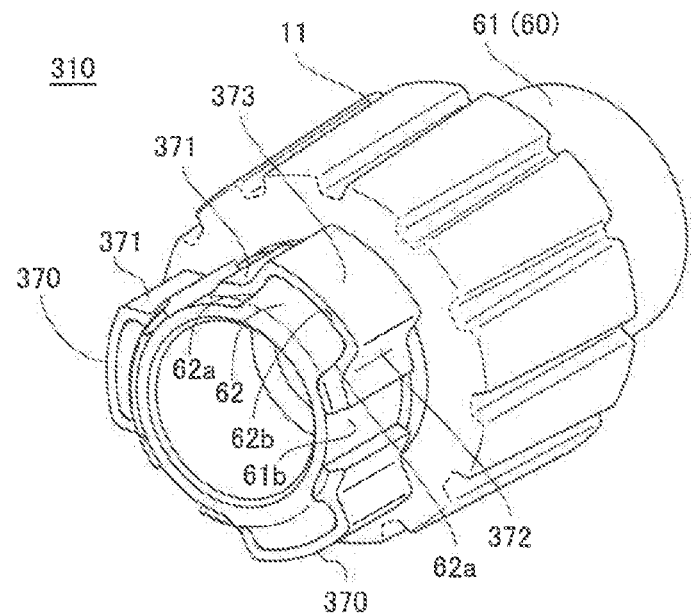
FIG. 14 is a perspective view showing the structure of a damper according to a second modified example of a preferred embodiment of the present invention.

While the reinforcers are preferably separately provided on the two opposed side surfaces of the bushing-side protrusion in the circumferential direction, respectively, when the damper includes the plurality of reinforcers in the preferred embodiments described above, the present invention is not restricted to this. For example, as in a damper 310 according to a second modified example shown in FIG. 14, a reinforcer 370 may alternatively be provided across bushing-side pressing surfaces 62a, which are two opposed side surfaces of one bushing-side protrusion 62 in a circumferential direction. That is, the reinforcer 370 is provided for each bushing-side protrusion 62 so as to cover a surface (the bushing-side pressing surfaces 62a and a top surface 62b) of the bushing-side protrusion 62. In addition, a portion of the outer peripheral surface 61b of a bushing 60 is exposed.

Figure 15:
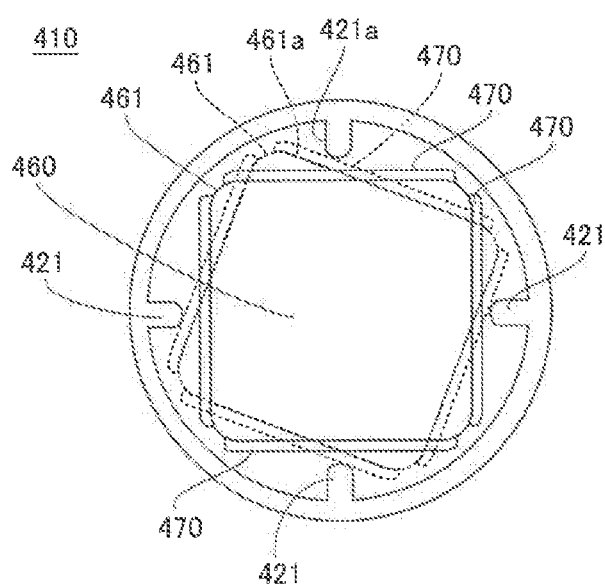
FIG. 15 is a sectional view showing the structure of a damper according to a third modified example of a preferred embodiment of the present invention.

While the bushing preferably includes the bushing-side protrusions in the preferred embodiments described above, the present invention is not restricted to this. For example, as in a damper 410 according to a third modified example shown in FIG. 15, a bushing 460 may not include bushing-side protrusions, and the damper 410 may include a reinforcer 470 between a pressing surface 461a of a corner 461 of the bushing 460 and a pressing surface 421a of a stopper 421 of a cylinder 420. The pressing surface 421a is an example of a "first pressing surface". The pressing surface 461a is an example of a "second pressing surface".

While the cylinder preferably includes the inner cylinder and the outer cylinder in the preferred embodiments described above, the present invention is not restricted to this. For example, the cylinder may alternatively include only one cylinder.

While the reinforcer is preferably movable relative to each of the bushing-side pressing surface and the cylinder-side pressing surface in the preferred embodiments described above, the present invention is not restricted to this. For example, the reinforcer may alternatively be fixed to the bushing-side pressing surface and may alternatively be movable relative to only the cylinder-side pressing surface.

While the reinforcer is preferably plated with a wear resistant material in the preferred embodiments described above, the present invention is not restricted to this. That is, from the viewpoint of significantly reducing or preventing an increase in the frequency of replacement of the damper, it is preferable to plate a wear resistant material on the reinforcer, but it is not always necessary to plate a wear resistant material on the reinforcer.

While the reinforcer is preferably made of stainless steel in the preferred embodiments described above, the present invention is not restricted to this. For example, the reinforcer may alternatively be made of a metal material such as titanium and carbon steel, or a wear resistant material other than a metal material.

While the bushing preferably includes the plurality of bushing-side protrusions in the preferred embodiments described above, the present invention is not restricted to this. For example, the bushing may alternatively include only one bushing-side protrusion.

While the reinforcer is preferably plate shaped or substantially plate shaped in the preferred embodiments described above, the present invention is not restricted to this. For example, the reinforcer may alternatively have a block shape.

While the thicknesses t1 of the first portion and the second portion of the reinforcer are preferably smaller than the width W1 of the bushing-side protrusion along the circumferential direction in the preferred embodiments described above, the present invention is not restricted to this. For example, when the maximum operating angle of the damper is able to be reduced, the thicknesses t1 of the first portion and the second portion of the reinforcer may alternatively be larger than the width W1 of the bushing-side protrusion along the circumferential direction.

While the spacer preferably includes one member and has an annular shape in the preferred embodiments described above, the present invention is not restricted to this. For example, a plurality of spacers may alternatively be combined and have an annular shape.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An outboard motor comprising:
a propeller shaft; and
a propeller unit disposed on the propeller shaft and including:
a damper disposed around the propeller shaft;
a cylinder including a first pressing surface on an inner surface thereof, and that is disposed around the damper and engages with the damper; and
a blade disposed radially outward of the cylinder; wherein the damper includes:
a bushing fixed to a periphery of the propeller shaft and including a second pressing surface that presses the first pressing surface of the cylinder in a circumferential direction;
an elastic member disposed around a portion of the bushing different from the second pressing surface of the bushing in an axial direction and that elastically and deformably engages with the inner surface of the cylinder; and a reinforcer provided separately from the bushing and disposed between the first pressing surface and the second pressing surface; and a wear resistance of a material of which the reinforcer is made is higher than a wear resistance of a material of which the bushing is made.

2. The outboard motor according to claim 1, wherein the reinforcer is movable relative to each of the first pressing surface and the second pressing surface.

3. The outboard motor according to claim 1, wherein the cylinder includes a first protrusion including the first pressing surface and that protrudes radially inward from the inner surface of the cylinder;

the bushing includes a second protrusion including the second pressing surface and that protrudes toward the inner surface of the cylinder; and the reinforcer is disposed between the first pressing surface defining a side surface of the first protrusion in the circumferential direction and the second pressing surface defining a side surface of the second protrusion in the circumferential direction.

4. The outboard motor according to claim 3, wherein the second protrusion of the bushing includes a plurality of second protrusions; and the reinforcer includes a first portion that contacts the second protrusion in a first circumferential direction of the circumferential direction among the second protrusions that are adjacent to each other, a second portion that contacts the second protrusion in a second circumferential direction of the circumferential direction among the second protrusions that are adjacent to each other, and a connector that connects the first portion and the second portion.

5. The outboard motor according to claim 4, wherein, when the elastic member elastically deforms in the first circumferential direction, the reinforcer contacts the second pressing surface of the second protrusion in the first circumferential direction and is spaced apart from the second pressing surface of the second protrusion in the second circumferential direction, and when the elastic member elastically deforms in the second circumferential direction, the reinforcer contacts the second pressing surface of the second protrusion in the second circumferential direction and is spaced apart from the second pressing surface of the second protrusion in the first circumferential direction.

6. The outboard motor according to claim 4, wherein the reinforcer includes a plurality of reinforcers; and the plurality of reinforcers are separately provided on two opposed side surfaces of the second protrusion in the circumferential direction, respectively.

7. The outboard motor according to claim 3, wherein the reinforcer covers the second pressing surface of the second protrusion and a portion of a radially outer peripheral surface of the second protrusion.

8. The outboard motor according to claim 3, wherein the reinforcer is plate shaped or substantially plate shaped along at least a portion of an outer peripheral surface of the bushing and at least a portion of the side surface of the second protrusion in the circumferential direction.

9. The outboard motor according to claim 8, wherein a thickness of a portion pressed by the first pressing surface and the second pressing surface in the reinforcer is smaller than a length of the second protrusion along the circumferential direction.

10. The outboard motor according to claim 1, wherein a mechanical strength of a metal material of which the reinforcer is made is larger than a mechanical strength of a metal material of which the bushing is made.

11. The outboard motor according to claim 10, wherein the bushing is made of brass; and the reinforcer is made of stainless steel.

12. The outboard motor according to claim 1, wherein the reinforcer is plated with a wear resistant material.

13. The outboard motor according to claim 1, wherein the damper includes a spacer having an elastic modulus lower than an elastic modulus of the elastic member, and the spacer is located between the reinforcer and the elastic member in the axial direction of the propeller shaft.

14. The outboard motor according to claim 13, wherein the spacer has an annular shape that surrounds a periphery of the bushing.

15. The outboard motor according to claim 13, wherein the spacer is plated with a wear resistant material.

16. The outboard motor according to claim 1, wherein the reinforcer is attachable to and detachable from the damper.

17. A damper for a propeller unit including a cylinder disposed around a propeller shaft and including a first pressing surface on an inner surface thereof, and a blade disposed radially outward of the cylinder, the damper comprising:

a bushing fixed to a periphery of the propeller shaft and including a second pressing surface that presses the first pressing surface of the cylinder in a circumferential direction;

an elastic member disposed around a portion of the bushing different from the second pressing surface of the bushing in an axial direction and that elastically and deformably engages with the inner surface of the cylinder; and a reinforcer provided separately from the bushing and disposed between the first pressing surface and the second pressing surface; wherein a wear resistance of a material of which the reinforcer is made is higher than a wear resistance of a material of which the bushing is made.

18. The damper for a propeller unit according to claim 17, wherein the reinforcer is movable relative to each of the first pressing surface and the second pressing surface.

19. An outboard motor comprising:

a propeller shaft; and a propeller unit disposed on the propeller shaft and including:

a damper disposed around the propeller shaft;

a cylinder including a first pressing surface on an inner surface thereof, and that is disposed around the damper and engages with the damper; and a blade disposed radially outward of the cylinder; wherein the damper includes:

a bushing fixed to a periphery of the propeller shaft and including a second pressing surface that presses the first pressing surface of the cylinder in a circumferential direction;

an elastic member disposed radially outward of a portion of the bushing different from the second pressing surface of the bushing in an axial direction and that elastically and deformably engages with the inner surface of the cylinder; and a reinforcer provided separately from the bushing and disposed between the first pressing surface and the second pressing surface.

20. The outboard motor according to claim 19, wherein the elastic member extends circumferentially around the bushing.

\* \* \* \* \*